US012745754B2

(12) United States Patent
Parrish

(10) Patent No.: US 12,745,754 B2
(45) Date of Patent: Sep. 29, 2026

(54) AGILITY PERFORMANCE SYSTEM

(71) Applicant: Michael D Parrish, Albuquerque, NM (US)

(72) Inventor: Michael D Parrish, Albuquerque, NM (US)

( * ) Notice: Subject to any disclaimer, the term of this patent is extended or adjusted under 35 U.S.C. 154(b) by 0 days.

(21) Appl. No.: 18/663,109

(22) Filed: May 14, 2024

(65) Prior Publication Data

US 2024/0415098 A1 Dec. 19, 2024

Related U.S. Application Data

(63) Continuation-in-part of application No. 17/543,295, filed on Dec. 6, 2021, now Pat. No. 11,998,858.

(51) Int. Cl.
*A01K 15/02* (2006.01)

(52) U.S. Cl.
CPC .................................. *A01K 15/027* (2013.01)

(58) Field of Classification Search
CPC .. A63K 3/04; A63K 3/043; A63B 5/00; A63B 5/02; A01K 15/02
See application file for complete search history.

(56) References Cited

U.S. PATENT DOCUMENTS 3,294,400 A * 12/1966 Goldstein ................ A63B 5/02
3,366,381 A 1/1968 Ross
4,696,470 A * 9/1987 Fenner ...................... A63B 5/02 272/144
5,913,283 A 6/1999 Coury
6,976,452 B1 12/2005 Godsil
9,566,536 B2 2/2017 Manley
11,229,815 B1 * 1/2022 Duval .................. A63B 21/068
11,998,858 B2 6/2024 Parrish
2003/0186793 A1 * 10/2003 Chen ...................... A63B 71/00 482/140
2015/0114308 A1 * 4/2015 Dolphin ................... A63K 3/04
2022/0047929 A1 2/2022 Tuffman
2024/0415098 A1 12/2024 Parrish

* cited by examiner

*Primary Examiner* — Joshua J Michener
*Assistant Examiner* — Henry Hooper Mudd
(74) *Attorney, Agent, or Firm* — KPPB Law; Luis M. Ortiz; Kermit D. Lopez

(57) ABSTRACT

An improved agility system can include a first stanchion rotatably secured within a storage area of a first base by a shaft and rotatable at least ninety degrees from the storage area into an upright position with respect to the first base. The system can include a second stanchion rotatably secured within a storage area of a first base by a shaft and rotatable at least ninety degrees from the storage area into an upright position with respect to the second base, a retaining means formed within the stanchions, and a bar suspendable horizontally by the retaining means. Retaining means can be comprised of bore holes or notches formed at various distances along the stanchions from their respective shafts, metallic or magnetic strips formed along sides of the first and second stanchions, or metallic or magnetic elements disposed at various distances along sides of the first and second stanchions.

18 Claims, 7 Drawing Sheets

AGILITY PERFORMANCE SYSTEM

This application is a continuation-in-part of U.S. patent application Ser. No. 17/543,295, filed Dec. 6, 2021, and entitled "Agility Performance System", which is hereby incorporated by reference.

TECHNICAL FIELD

The embodiments relate to dog agility training and related equipment, and more specifically to apparatuses used as part of a system for performing trial runs for through equipment representative of what is typically used in running canine through various fixed obstacles on an agility course.

BACKGROUND

"Agility" is commonly known to be a dog sport that began as an exhibition sport in Great Britain and it has since spread around the world, with major competitions held worldwide. It was patterned after equestrian events and combines handler control, agility, and confidence. An agility ring is set up with a variety of obstacles. Obstacles can include jumps, tunnels, a dog walk, a see-saw or teeter, an A-frame, and weaver poles. The ring is generally square, about 100 ft. by 100 ft., and is typically fenced off from spectators. Dogs can go through the ring on a leash with a handler (basic agility), or off leash with a guiding handler (advanced agility). Dogs are judged by their ability to correctly negotiate the obstacles in a predetermined order. The dogs are judged primarily by the correctness by which they move on and off the obstacles and by which they stop and stay (on command) on other obstacles. The dogs are secondarily judged by their time in completing the obstacle course. This event requires significant training of both the handler and their dog. An agility course surfaces may be of grass, dirt, rubber, or special matting. Depending on the type of competition, the obstacles may be marked with numbers indicating the order in which they must be completed.

Dogs can begin training for agility at any age, but care is taken when training dogs under a year old so as to not harm their developing joints. Dogs generally start training on simplified, smaller, or lowered (in height) agility equipment and training aids (such as ladders and wobbling boards to train careful footing), but puppies who learn quickly must be finished growing before training on equipment at standard height to prevent injury.

Training techniques for each piece of equipment varies. The techniques for training the weave poles include using offset poles that gradually move more in line with each other, poles that tilt outward from the base and gradually become upright, wires or gates around the poles forcing the dog into the desired path and putting a hand in the dog's collar and guiding the dog through while leading with an incentive. It also includes teaching the dog to run full speed between two poles and gradually increasing the angle of approach and number of poles.

Agility may be trained independently (for instance at home) or with an instructor or club that offers classes. Seasoned handlers and competitors, in particular, may choose to train independently, as structured classes are commonly geared towards novices. Seasoned handlers often instead look to seminars and workshops that teach advanced handling techniques, and then practice on their own. Common reasons for joining an agility class include:

- Access to agility equipment, especially the larger contact obstacles, which can be expensive, difficult to build, and require a lot of space to use.
- Seeking the guidance and expertise of more experienced handlers.
- Enjoying the social venue that many classes provide.
- Training in a more distracting environment, which is helpful in preparation for competition.

In addition to the technical and educational training, physical training must also be done. The dog must be fit enough to run and jump without causing stress or injury to its body. The handler can also benefit from being physically fit, but with some handling styles it is not necessary to keep up with the dog (nor is it possible with very fast dogs). Being able to handle a dog from a distance allows mobility-impaired handlers to participate in the sport on par with mobile handlers. Research has also demonstrated health benefits to handlers engaged in dog agility.

A jump, or hurdle, is an example of equipment used in agility. A jump typically has two uprights supporting a horizontal bar over which the dog jumps. The height is adjusted for dogs of different heights. The uprights can be simple stanchions of various shapes, sizes, and colors. The height of the jumps must be routinely adjusted for animals of different sizes or classes, or for different types of animals or competitions. There are one-piece dog jumps have stanchions that are mechanically fixed or welded to the base. Existing two-piece dog jumps have stanchions with separate external supporting structures.

Weave poles are another example of equipment used in agility. Similar to a slalom, this is typically a series of 5 to 12 upright poles, each about 3 feet (0.91 m) tall and spaced up to about 24 inches (61 cm) apart (extra spacing length relieve stress on the dog's back) through which the dog weaves. The dog must always enter with the first pole to their left, and must not skip poles. For many dogs, weave poles are one of the most difficult obstacles to master. The dog must enter the obstacle by passing between the first two poles from the right to the left, the next from left to right, and so on, continuing the alternating sequence for the full length of the set.

It would be more convenient if current jumps were more portable and storage in a low and easily collapsible profile. It would also be more convenient if separate aspect of agile equipment could be combined for convenience of storage and use.

SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is an aspect of the embodiments to provide an improved agility system that can include a first stanchion rotatably secured within a storage area of a first base by a shaft and rotatable at least ninety degrees from the storage area into an upright position with respect to the first base. The system can also include a second stanchion rotatably secured within a storage area of a first base by a shaft and rotatable at least ninety degrees from the storage area into an upright position with respect to the second base.

It is an aspect of the embodiments that a pair of stanchions rotatable by a shaft from within a storage area of an associated base can be utilized for suspending a bar horizontally between the pair of stanchions by retaining means formed on first and second stanchions.

It is another aspect of the embodiments that a plurality of stanchions rotatable by a shaft from within a storage area of an associated base can be utilized for defining a slalom course.

It is yet another aspect of the embodiments that the retaining means can be comprised of bore holes formed at various distances along the stanchions from their respective shafts.

It is yet another aspect of the embodiments that the retaining means can be comprised of bore notches formed at various distances along the stanchions from their respective shafts.

It is another aspect of the embodiments that the retaining means can be comprised of metallic or magnetic strips disposed along sides of the first and second stanchions.

It is another aspect of the embodiments that the retaining means can be comprised of metallic or magnetic elements disposed at various distances along sides of the first and second stanchions.

It is another aspect of the embodiments that the retaining means can be comprised of slots formed entirely through a surface of the sides of the first and second stanchions that include an arc-shaped and centered holding area for loosely retaining a bar within the slots.

It is another aspect of the embodiments that the at least one of a bar holder, a treat holder, retaining pin holder, and complimentary magnets can be formed in at least one of the bases.

It is another aspect of the embodiments that a bar holder be formed on a side of at least one of the bases to retain the bar during storage and transport of the agility performance system.

It is another aspect of the embodiments that a treat holder be formed in a top surface of at least one of the bases to hold treats for dogs during training.

It is another aspect of the embodiments that a retaining pin holder be formed on an end of at least one of the bases to retain a retaining pin when not in use to insert in a side of the base to prevent a stanchion from being knocked down into the base.

It is another aspect of the embodiments that complimentary magnets be incorporated into sides of each base to facility attraction of the bases towards each other for transport and storage.

It is another aspect of the embodiments that a bar holding means be formed on at least one side of at least one base to facilitate retention and secure storage of the bar during transport and storage.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION

Figure 1:
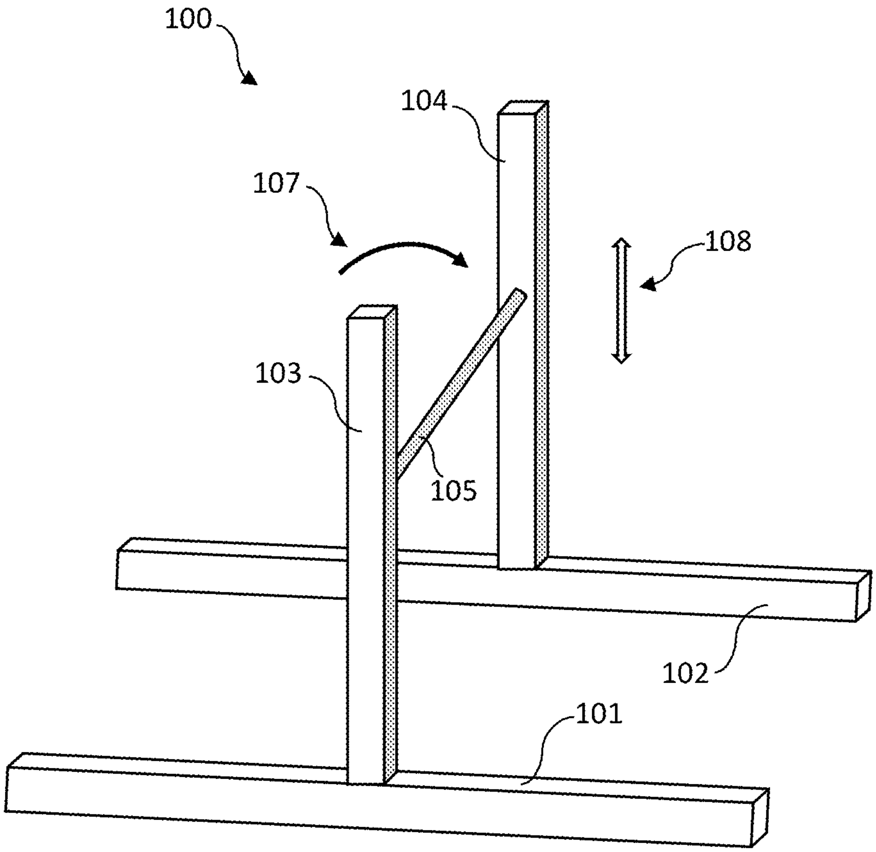
FIG. 1 (Prior Art)
FIG. 1, labeled as Prior Art, illustrates an example of equipment used for a jump in agility training.

The particular values and configurations discussed in these non-limiting examples can be varied and are cited merely to illustrate one or more embodiments and are not intended to limit the scope thereof.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware, or any combination thereof (other than software per se). The following detailed description is, therefore, not intended to be interpreted in a limiting sense.

Throughout the specification and claims, terms may have nuanced meanings suggested or implied in context beyond an explicitly stated meaning. Likewise, phrases such as “in one embodiment” or “in an example embodiment” and variations thereof as utilized herein do not necessarily refer to the same embodiment and the phrase “in another embodiment” or “in another example embodiment” and variations thereof as utilized herein may or may not necessarily refer to a different embodiment. It is intended, for example, that claimed subject matter include combinations of example embodiments in whole or in part.

In general, terminology may be understood, at least in part, from usage in context. For example, terms such as “and,” “or,” or “and/or” as used herein may include a variety of meanings that may depend, at least in part, upon the context in which such terms are used. Typically, “or” if used to associate a list, such as A, B, or C, is intended to mean A, B, and C, here used in the inclusive sense, as well as A, B, or C, here used in the exclusive sense. In addition, the term “one or more” as used herein, depending at least in part upon context, may be used to describe any feature, structure, or characteristic in a singular sense or may be used to describe combinations of features, structures, or characteristics in a plural sense. Similarly, terms such as “a,” “an,” or “the”, again, may be understood to convey a singular usage or to convey a plural usage, depending at least in part upon context. In addition, the term “based on” may be understood as not necessarily intended to convey an exclusive set of factors and may, instead, allow for existence of additional factors not necessarily expressly described, again, depending at least in part on context.

The term “at least one” as utilized can mean “one or more”. For example, “at least one widget” may mean the same as “one or more widgets”. Likewise, the term “a plurality of” may refer to “a group of”. For example, “a plurality of widgets” may have the same meaning as “a group of widgets”.

As described in the Background, a jump, or hurdle, is an example of equipment used in agility. Referring to FIG. 1, labeled as “Prior Art”, a jump 100 is illustrated. A jump 100 typically has two stanchions 103/104, which are basically upright arms (e.g., bar, post, or frame) for supporting a bar 105 horizontally over which the dog jumps. The height of the bar 105 can be adjusted along the stanchions 103/104 as shown by arrow 108 to accommodate dogs of different heights. The stanchions 103/104 can be designed of various shapes, sizes, and colors. The height of the jumps must be routinely adjusted for animals of different sizes or classes, or for different types of animals or competitions. There are one-piece dog jumps that have stanchions 103/104 that are mechanically fixed or welded to a base 101/102. Existing two-piece dog jumps have stanchions 103/104 with separate external supporting structures functioning as a base 101/102. The base 101/102 for each respective stanchion 103/104 is the lowest part or edge of the jump on which the stanchions 103/104 rest and are supported and are in contact with the ground of an agility course.

It is important that bars 105 can be adjusted up and down on supporting stanchions 103/104 while remaining horizontal in order to create the barrier over which dogs must jump as indicated by the arrow 107 in FIG. 1. According to the American Kennel Club National Agility Championship Eligibility Requirements, 2019 Regulation change, dogs may only be entered in one jump height division per day for all classes. The following jump height divisions shall be used in all trial Regular classes:

8 Inches: For dogs 11 inches and under at the withers.
12 Inches: For dogs 14 inches and under at the withers.
16 Inches: For dogs 18 inches and under at the withers.
20 Inches: For dogs 22 inches and under at the withers.
24 Inches: For dogs over 22 inches at the withers.
Dogs may not be entered in this class if they are 22 inches and under.
24 Inch Choice: Dogs may be entered at this height at their owner’s discretion if their measurement is 22 inches and under at the withers.

Figure 2A:
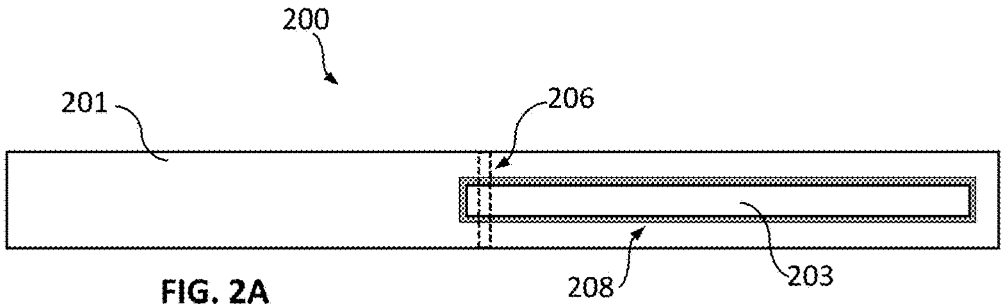
FIG. 2A illustrates a top view of an integrated stanchion-base system, in accordance with aspects of the embodiments.

Referring to FIG. 2A, illustrated is a top view of an integrated stanchion-base system 200 in accordance with aspects of the embodiments. The integrated stanchion-base system 200 can include a base portion 201 that includes a storage area 208 formed within one side of the base wherein a stanchion 203 can be stored within the base 201, and retracted from the base 201 during the integrated stanchion-base system’s 200 use as an agility jump. The stanchion 203 can be rotatably retained within the base by a shaft 206 located near the middle of the base 201.

Figure 2B:
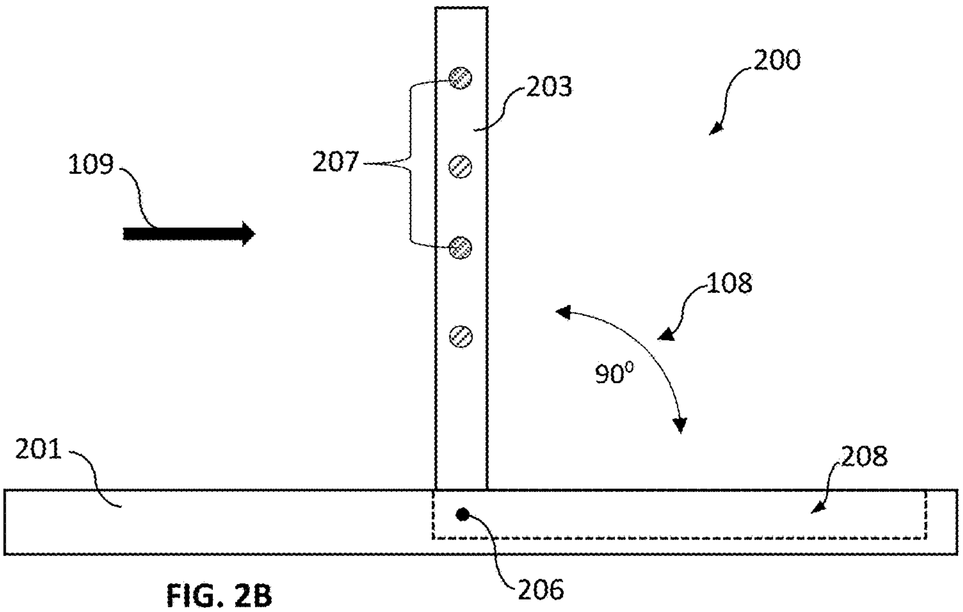
FIG. 2B illustrates a side view of an integrated stanchion-base system, in accordance with aspects of the embodiments.
Figure 2C:
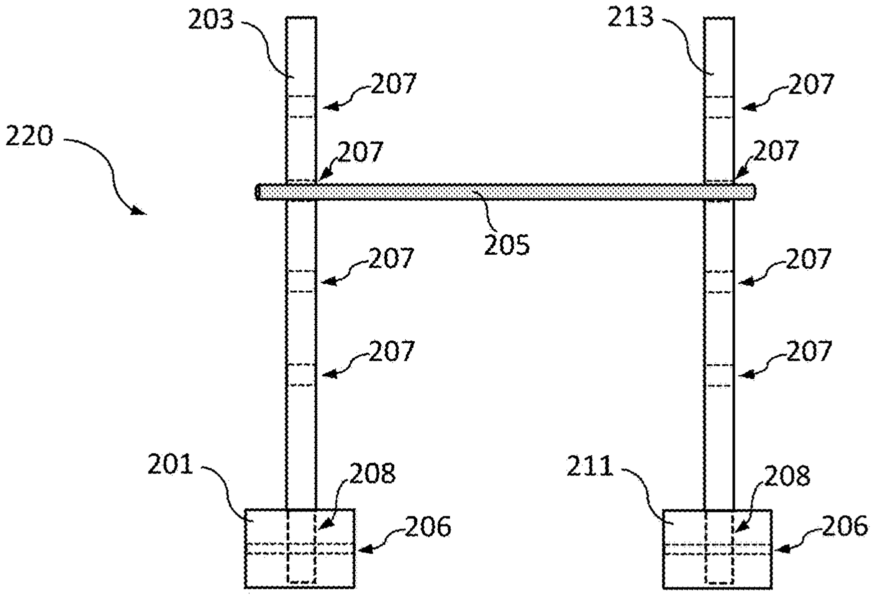
FIG. 2C illustrates a set of integrated stanchion-base systems operating together to secure and suspend a bar horizontally, in accordance with aspects of the embodiments.

Referring to FIG. 2B, illustrated is a side view 200 of the integrated stanchion-base system. As shown in FIG. 2B, the shaft 206 can enable the stanchion 203 to rotate ninety degrees (90°) from its stored position within the base 201 to a fully extended upright position where it is then ready for use with another integrated stanchion-base system and operate together to secure a bar 205, as shown in FIG. 2C. The stanchions 203/213 can include retaining means 207 formed along their respective sides and adapted to hold or retain an end of bar 205. The retaining means 207 can be provided as a plurality of holes or notches bored into or through the stanchions 203/213 at different distances from the stanchion’s coupling point by shaft 206 at the base 201/211. The plurality of holes or notches 207 facilitate the provision of various heights at which the bar 205 can be positioned horizontally above the base 201/211. Arrow 109 depicts the direction from which a dog may approach the integrated stanchion-base system 220. It is a feature of the embodiment that the stanchions 203/213 and horizontal bar 105 that may be retained by retaining means 207 can safely rotate along the direction of arrow 209 (the stanchion rotating 90 degrees back toward its storage position within storage area 208) should a dog come into contact with the stanchion 203 or horizontally suspended bar 205.

Referring to FIG. 2C, end views 220 of an assembled agility jump system is illustrated, in accordance with the embodiment, wherein the agility jump 220 is formed using a set of integrated stanchion-base systems are utilized to securely hold a bar 205 horizontally to create a barrier over which a dog can jump during agility training and competition. A first stanchion 203 is fully rotated 90 degrees outside of its base 201. A second stanchion 213 is fully rotated 90 degrees outside of its base 211. Bases 201 and 211 can be positioned parallel to each other, thus enabling the first and second stanchions 203/213 to also be positioned parallel to each other when fully retracted from their respective storage areas 208. The bar 205 is shown being retained within retaining means 207 provided in the form of holes bored through stanchions 203 and 213. The bar 205 could be raised or lowered by positioning it horizontally within parallel holes formed along the stanchions at various heights above the bases 201 and 211.

Figure 3:
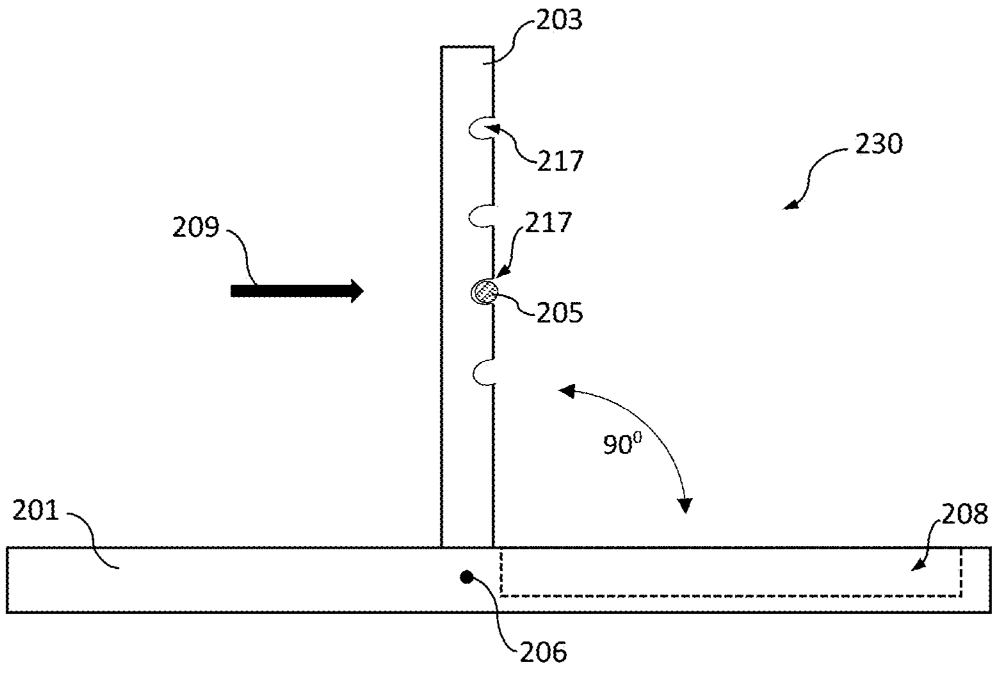
FIG. 3 illustrates an alternate embodiment wherein notches can be formed into a side of the stanchion to serve as the retaining means for supporting a bar horizontally.

Referring to FIG. 3, illustrated is side view 230 of an alternate embodiment wherein notches 217 can be formed into a side of the stanchion 203 to serve as the retaining means 217 for a bar 205. In the depicted embodiment, a dog moving in the direction of arrow 209 that may come into contact with a bar 205 may knock the support bar 205 out of a notch 217 without causing the stanchion 203 to rotate or move. This would ideally prevent injury to a dog that comes into contact with the bar 205.

Figure 4A:
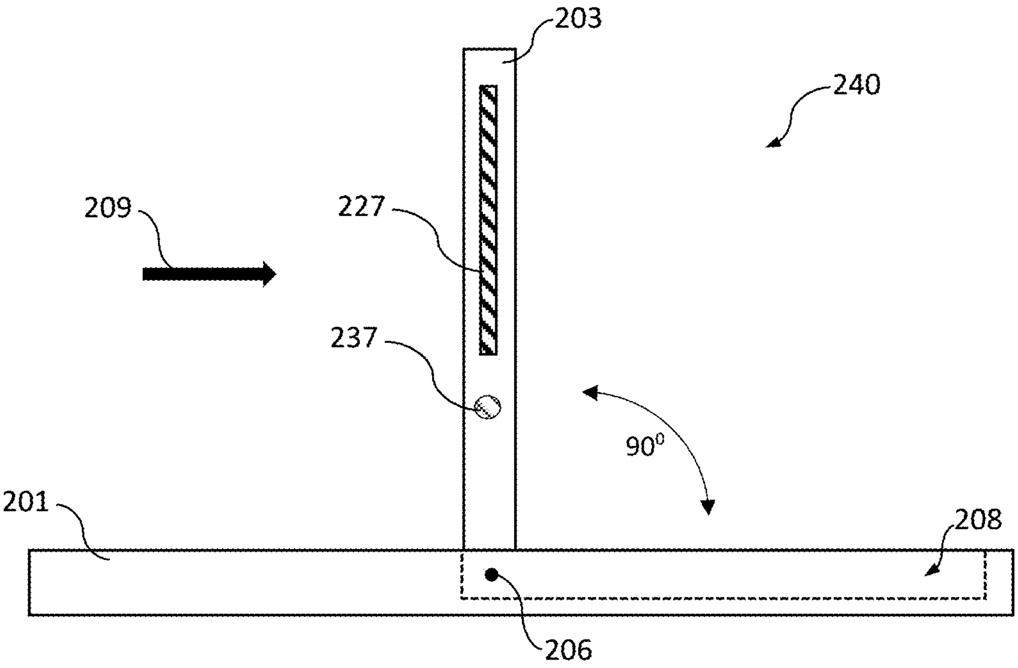
FIGS. 4A, 4B and 4C illustrate another embodiment wherein metal or magnetic elements can be embedded into complementary sides of stanchions.
Figure 4B:
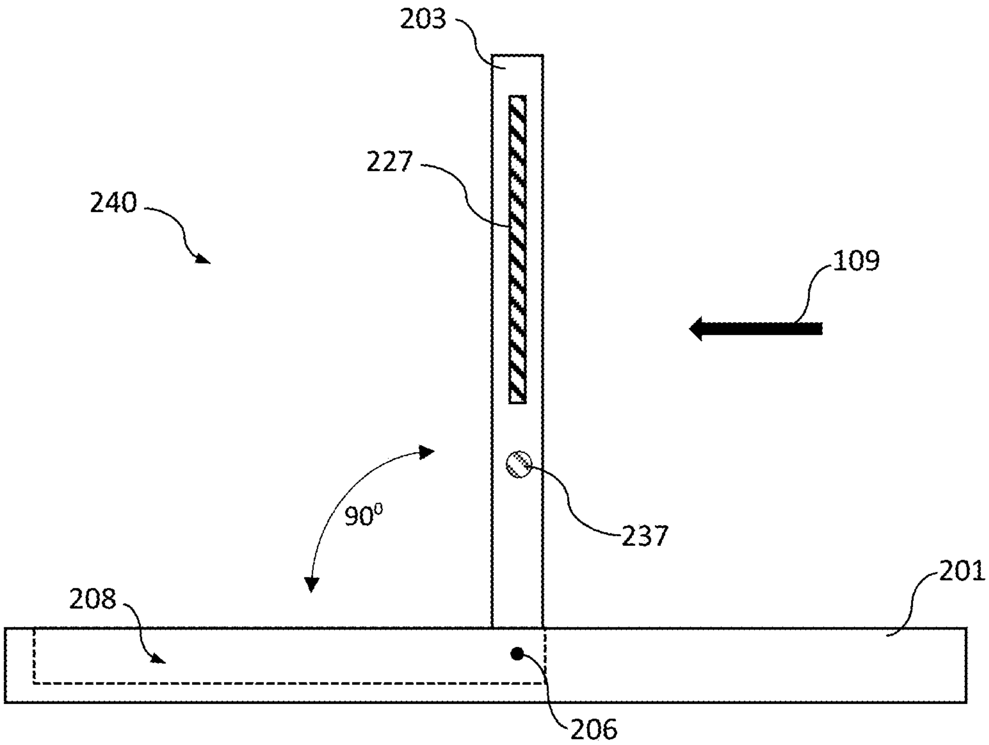

Referring to FIGS. 4A/4B, illustrated is another embodiment wherein metal or magnetic elements 227/237 can be embedded into complementary inner sides of stanchions 203/213. Complementary sides would face each other when used to suspend a bar 205 vertically between the stanchions 203/213, which is why opposite side views of stanchions 203 and 213 are shown in FIG. 4A and FIG. 4B. The strip 227 can extend along a larger portion of stanchions 203/213, providing greater flexibility is setting a horizontal height for bar 205. Separate elements 237, however, can provide for specific heights (e.g., regulation heights) along the stanchions 203/213, which may be important for competitions where regulation heights must be followed. It should be appreciated that the strip 227 or separate elements 237 can be magnetic where the end of the support bar 205 is metal, or the end of the support bar can be comprised of magnetic material which would allow the strip 227 or separate elements 237 to simply be metallic. It is only important that one or the other (the ends of the support bar 205, or the strip 227/separate elements 237) is magnetic in order for the system to work properly to support the bar 205.

Figure 4C:
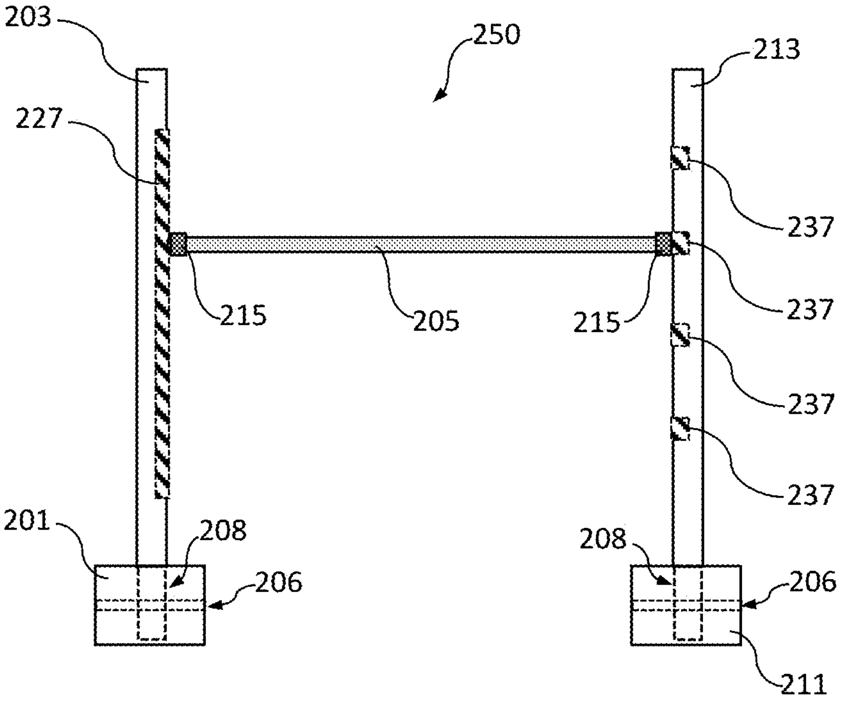

Referring to FIG. 4C, illustrated is an assembled agility jump 250, in accordance with an embodiment. Stanchion 203 is shown with a strip 227 formed in and extending along its side and magnetically supporting a first end of a bar 105. Stanchion 213 is shown alternatively with a plurality of elements 237 formed in location along its side and magnetically support a second end of bar 205. It should be appreciated that FIG. 4C is only provided to illustrate that embodiments with a set of integrated stanchions-bases can use either an integrated strip 227 or a plurality of separate elements 237 as exemplified in the FIG. 4C to suspend a bar 205 at different heights above ground. The bar 205 would include ends 215 that are either metal or magnetic, opposite-type material of strip 227 or elements 237, in order to be magnetically held in a horizontal position by the integrated strips 227 or plurality of elements 237 disposed on the stanchions 203. During use, both stanchions would utilize the same retaining means 207 (e.g., bore hole, notch, magnetic strip, metallic strip, metallic elements, metallic elements). The strength of magnetic attachment of the bar 205 by its magnetic or ends 215 to the stanchions 203/213 can be selected by magnetic material to enable adequate support of bar 205 between the stanchions 203/213 and also to enable the bar 205 to move and fall away from a dog and its attachment to the stanchions 203/213 when the bar 205 is impacted by a dog or handler, thereby reducing the likelihood of injury to the dog.

Figure 5A:
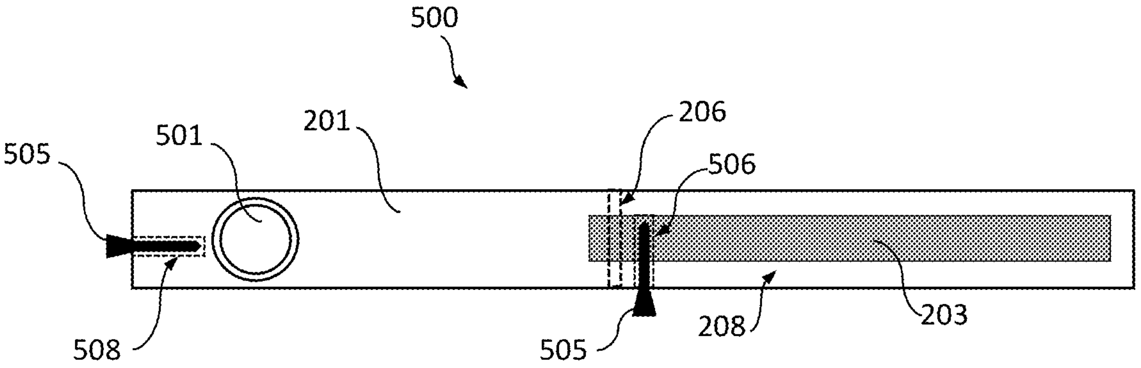
FIG. 5A illustrates a top view of another integrated stanchion-base system, in accordance with aspects of an embodiments.

Referring to FIG. 5A, illustrated is a top view 500 of another integrated stanchion-base system, in accordance with aspects of an embodiments. A top surface of the base 201 can include a treat cup 501 integrated therein. The treat cup 501 can be used to hold treats for dogs that successfully traverse through an obstacle course created using stanchion-base systems. A stanchion retention pin 505 can be inserted into a stanchion retention shaft 506 formed in the side of the base 201 to prevent the stanchion 203 from folding down into its storage location within the base 201.

Figure 5B:
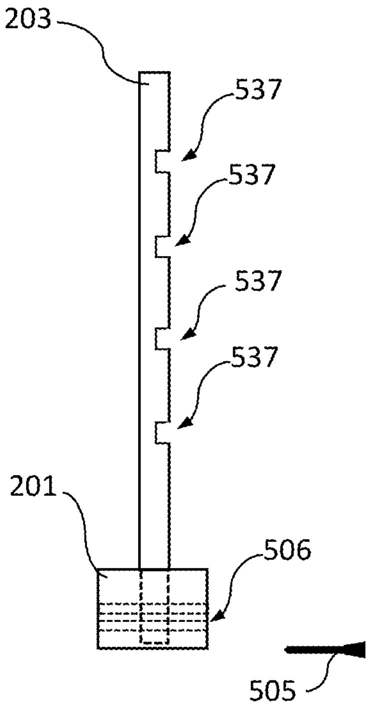
FIG. 5B illustrates a first end view of a stanchion-base system and a stanchion retaining pin, in accordance with aspects of an embodiment.

Referring to FIG. 5B, illustrated is a first end view of a stanchion-base system including a stanchion retaining pin 505 and including slots 537 formed along the stanchion's inner side, in accordance with aspects of an embodiment. The stanchion retaining pin 505 can be inserted into a stanchion retention slot 506 formed in the side of the base 201 to prevent the stanchion 203 from folding down into its storage location formed into the upper surface of the base 201 when the stanchion retaining pin 505 is in place. Also shown is a stanchion retaining pin storage slot 508, where the stanchion retaining pin 505 can be stored when the stanchion-base system is being transported or stored.

Figure 5C:
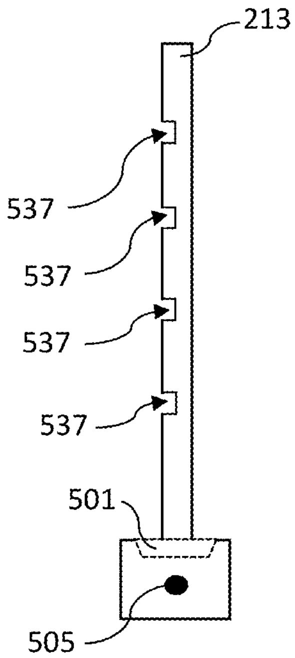
FIG. 5C illustrates a second end view, opposite the end view of the stanchion-based system in FIG. 5B, with a stanchion retaining pin stored in a retaining pin storage slot and showing a location for a dog treat tray location, in accordance with aspects of an embodiment.

Referring to FIG. 5C illustrated is a second end view, opposite the end view of the stanchion-based system in FIG. 5B, with a stanchion retaining pin 505 shown stored in a retaining pin storage slot 508 (see FIG. 5A) and also showing a location for a dog treat tray location 501 on an upper surface of the stanchion-based system.

Figure 6A:
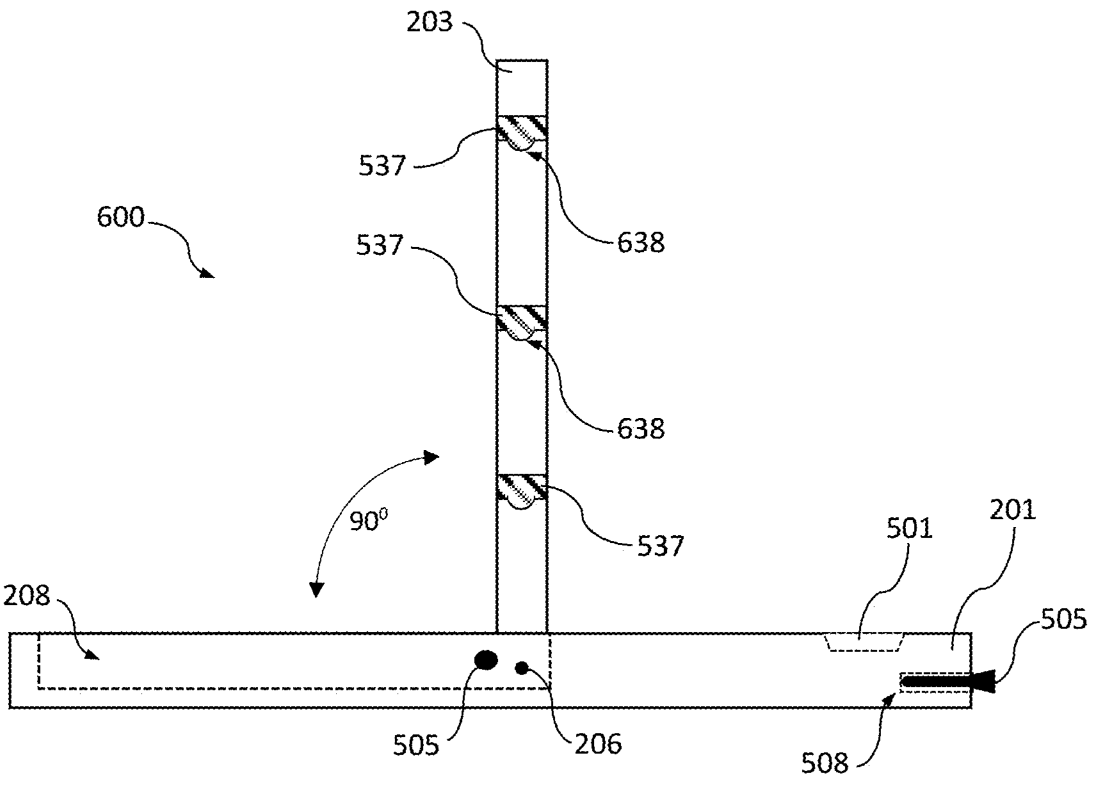
FIG. 6A illustrates a side view of a stanchion-base system with slots formed along an inner side of the stanchion and a stanchion retaining pin provided in the side of the base to hold the stanchion in an upright position, in accordance with aspects of an embodiment.

Referring to FIG. 6A illustrated is an inner side view 600 of a stanchion-base system with slots 637 formed along an inner side of the stanchion 203 to serve as retaining means for holding a bar 205 on the stanchions 203/213. Retaining means can be comprised of slots formed entirely through a surface of the sides of the first and second stanchions that include an arc-shaped and centered holding area 638 for loosely retaining a bar within the slots. A stanchion retaining pin 505 can be inserted into the side of the base 201 to hold the stanchion 203 in an upright position. A pet treat holder 501 is also shown integrated into the upper surface of the base 201.

Figure 6B:
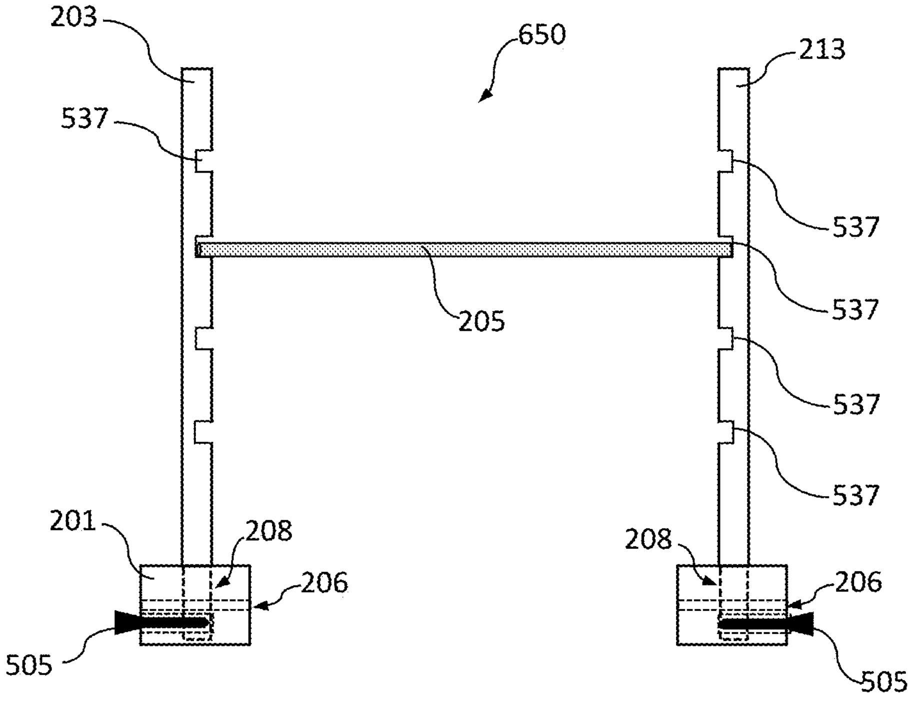
FIG. 6B illustrates two stanchions with the slots formed along their inner sides as shown in FIG. 6A, and also shown to include retaining pins installed in each base to maintain the stanchions in upright positions with respect to their respective bases, in accordance with aspects of an embodiment.

Referring to FIG. 6B, illustrated is a perspective view 600 of a stanchion-base system wherein two stanchions with the slots formed along their inner sides as shown in FIG. 6A are facing each other, and also showing stanchion retaining pins 505 that can be installed into each side of each base to maintain the stanchions in upright positions with respect to their respective bases, in accordance with aspects of an embodiment.

Figures 7A, 7B, 7C, 7D:
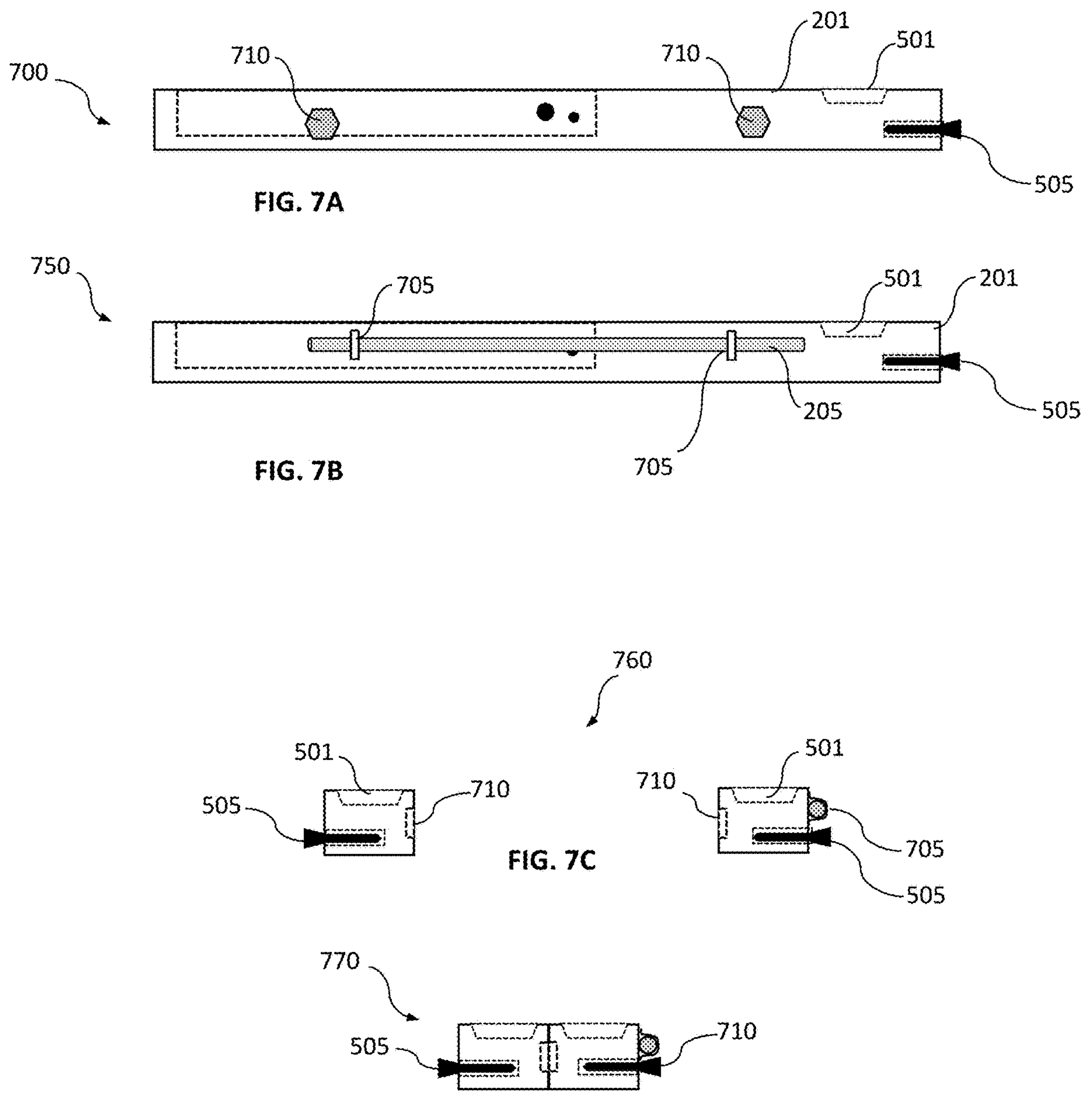
FIG. 7A illustrates a side view of a base including magnetic elements formed therein, in accordance with an aspects of an embodiment.
FIG. 7B illustrates another side view of a base illustrating a bar holder form on a side of the stanchion-base system, in accordance with an embodiment.
FIG. 7C illustrates end views of two bases separated apart from each other and showing magnetic elements formed on inner sides of the bases, in accordance with an embodiment.
FIG. 7D illustrates the end view of two bases from FIG. 7C now held together by the complimentary element formed in each inner side of the bases, in accordance with aspects of an embodiment.

Referring to FIG. 7A, illustrated is a side view 700 of a base including magnetic elements 710 formed therein, in accordance with an aspects of an embodiment. Magnetic elements 710 can be complimentary, thereby resulting in attraction as opposed to repulsion when two bases 201 are provided to carry out training.

Referring to FIG. 7B illustrated is yet another side view 750 of a base 201 illustrating a bar holder 705 formed on a side of the base 201 of the stanchion-base system described in FIG. 7A, in accordance with an embodiment. The bar holder 705 can be made from plastic rings that are able to accept, hold and store.

FIG. 7C illustrates end views 760 of two bases 201 separated apart from each other and showing magnetic elements 710 formed on inner sides of the bases 201, in accordance with an embodiment.

FIG. 7D illustrates the end views of the two bases from FIG. 7C now being held together by the complimentary magnetic elements 710 formed in each inner side of the bases 201, in accordance with aspects of an embodiment. The bases can be more easily stored and transported when magnets 710 cause the bases to be held together. The bar 205 and stanchion retention pins 505 are also less likely to be lost when they can remain attached to the stanchion-base system.

It can be appreciated given the foregoing teachings that the more than two integrated stanchions-bases can be utilized to create a slalom course for dogs. As mentioned in the Background, weave poles are another example of equipment used in agility. Similar to a slalom, this is typically a series of 5 to 12 upright poles, each about 3 feet (0.91 m) tall and spaced up to about 24 inches (61 cm) apart (extra spacing length relieve stress on the dog's back) through which the dog weaves. The dog must always enter with the first pole to their left and must not skip poles. For many dogs, weave poles are one of the most difficult obstacles to master. The dog must enter the obstacle by passing between the first two poles from the right to the left, the next from left to right, and so on, continuing the alternating sequence for the full length of the set. The stanchions extending from the bases in the present embodiments as described and shown in FIGS. 2A and 2B can serve as weave poles and a plurality of them (more than two of them) can be deployed on a surface so that they are about 24 inches apart. This enables the integrated stanchions-bases to fulfill another need (slalom training) in additional to barrier jumping.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all the following interpretations of the word: any of the items in the list, all the items in the list, and any combination of the items in the list.

The above detailed description of embodiments of the apparatus is not intended to be exhaustive or to limit the apparatus to the precise form disclosed herein. While specific embodiments of, and examples for, the apparatus are described above for illustrative purposes, various equivalent modifications are possible within the scope of the apparatus, as those skilled in the relevant art will recognize.

While certain aspects of the apparatus are presented below in certain claim forms, the inventors contemplate the various aspects of the apparatus in any number of claim forms. Accordingly, the inventors reserve the right to add additional claims after filing the application to pursue such additional claim forms for other aspects of the apparatus.

The invention claimed is:

1. An agility system, comprising:

a first stanchion rotatably secured within a storage area of a first base by a shaft and rotatable at least ninety degrees from the storage area into an upright position with respect to the first base;

a second stanchion rotatably secured within a storage area of a first second base by a shaft and rotatable at least ninety degrees from the storage area into an upright position with respect to the second base;

retaining means formed within the first and second stanchions and further comprised of slots formed entirely through a surface of sides of the first and second stanchions and include an arc-shaped holding area centered in the slots for loosely retaining a bar within the slots;

a bar suspendable horizontally by the retaining means formed within the first and second stanchions; and complimentary magnetic elements incorporated into at least one side of each base, wherein the complimentary magnetic elements function to enable bases to keep together for transport and storage.

2. The agility system of claim 1, further comprising at least one stanchion retaining pin installed a side of at least one of the first base or the second base to maintain its stanchion in an upright position with respect to the stanchion's respective base.

3. The agility system of claim 1, further comprising a treat cup installed on a top surface of at least one base.

4. The agility system of claim 1, further comprising bar storage means for securing the bar to a side of at least one base.

5. The agility system of claim 1, wherein bar storage means is provided in the form of rings mounted to a side of at least one base.

6. The agility system of claim 1, wherein the at least one stanchion retaining pin is installable at an end of at least one base to store the at least one stanchion pin when it is not in use.

7. An agility system, comprising:

a stanchion rotatably secured within a storage area of a base by a shaft and rotatable at least ninety degrees from the storage area into an upright position with respect to the base, wherein said stanchion includes a retaining means formed within an inner side of the stanchion and is further comprised of at least one slot formed entirely through a surface of sides of the stanchion and includes an arc-shaped holding area centered in the slots for loosely retaining a bar within the slots;

wherein the system can be used in an agility course as at least one of a pole amongst a plurality of poles defining a slalom course, or a first station and first base of a pair of first and second stanchion horizontally between the pair of first and second stations and associated bases;

at least one stanchion retaining pin installed on a side of at least one base to maintain a stanchion associated with the at least one base in an upright position with respect to the stanchion's respective base; and a stanchion retaining pin storage slot formed on at least one end of the base, wherein the at least one stanchion retaining pin is installable at an end of at least one base to store the at least one stanchion pin when it is not in use.

8. The agility system of claim 7, further comprising a second stanchion rotatably secured within a storage area of a second base by a shaft and rotatable at least ninety degrees from the storage area into an upright position with respect to the base.

9. The agility system of claim 7, further comprising a treat cup installed on a top surface of at least one base.

10. The agility system of claim 7, further comprising complimentary magnetic elements incorporated into at least one side of each base, wherein the complimentary magnetic elements function to enable bases to keep together for transport and storage.

11. The agility system of claim 7, further comprising bar storage means for securing the bar to a side of at least one base.

12. The agility system of claim 11, wherein bar storage means is provided in the form of rings mounted to a side of at least one base.

13. The agility system of claim 1, wherein the at least one stanchion retaining pin is installable at an end of at least one base to store the at least one stanchion pin when it is not in use.

14. An agility system, comprising:

a first stanchion rotatably secured entirely within a storage area formed in a first base by a shaft and rotatable at least ninety degrees from the storage area into an upright position with respect to the first base;

a second stanchion rotatably secured entirely within a storage area formed in a second base by a shaft and rotatable at least ninety degrees from the storage area into an upright position with respect to the second base;

retaining means formed within the first and second stanchions and further comprised of slots formed entirely through a surface of sides of the first and second stanchions and include an arc-shaped holding area centered in the slots for loosely retaining a bar within the slots; and a bar suspendable horizontally by the retaining means formed within the first and second stanchions; and complimentary magnetic elements incorporated into at least one side of each base, wherein the complimentary magnetic elements function to enable bases to keep together for transport and storage.

15. The agility system of claim 14, further comprising bar storage means for securing the bar to a side of at least one base.

16. The agility system of claim 14, wherein bar storage means is provided in the form of rings mounted to a side of at least one base.

17. The agility system of claim 14, wherein the at least one stanchion retaining pin is installable at an end of at least one base to store the at least one stanchion pin when it is not in use.

18. The agility system of claim 14, further comprising a treat cup installed on a top surface of at least one base.

* * * * *